United States Patent Office 3,321,560
Patented May 23, 1967

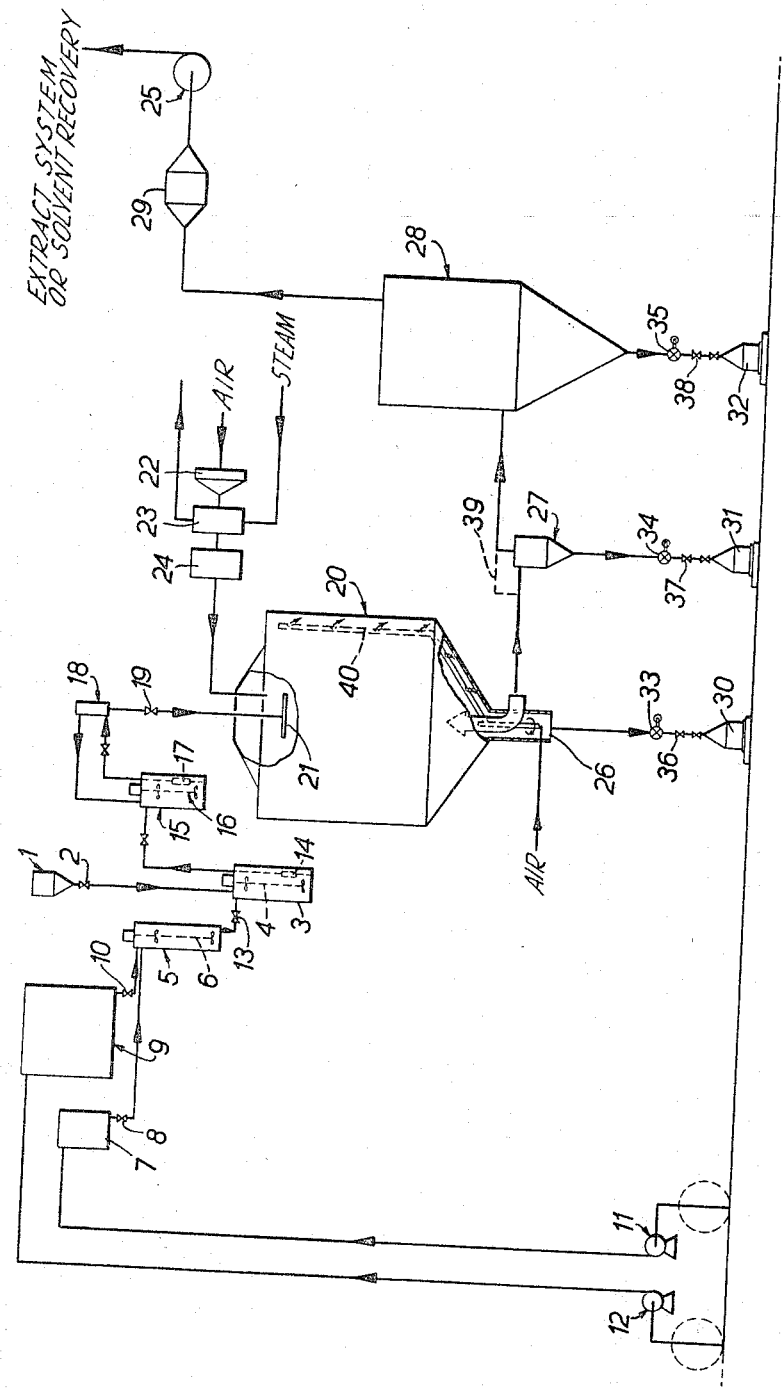

3,321,560
PRODUCTION OF FUEL FOR NUCLEAR REACTORS
William Lionel Wilkinson, Lytham Saint Anne's, England, assignor to United Kingdom Atomic Energy Authority, London, England
Filed June 14, 1965, Ser. No. 463,715
Claims priority, application Great Britain, June 30, 1964, 27,041/64
6 Claims. (Cl. 264—.5)

This invention relates to the production of fuel for nuclear reactors and in particular to the production of dry granules of ceramic nuclear fuel, an intermediate process in the overall production of nuclear reactor fuel elements.

One example of the production of nuclear reactor fuel elements involves the steps of producing a ceramic uranium compound such as uranium dioxide or uranium carbide by chemical means, forming granules of a mixture of the ceramic uranium compound and a suitable binder, drying the granules so formed, compacting a mass of the dry granules of the said mixture into bodies of suitable shapes, sintering the compacted bodies, treating the sintered shapes to eliminate the binder material, and fabricating a nuclear reactor fuel element, employing the said bodies suitably sheathed or in a suitable matrix, as the fuel members.

Granulation, which is a necessary prerequisite to give a free-flowing feed to an automatic press and to give reproducible bodies, may be performed in various ways, an example being the mechanical mixing of milled powder with a binder in liquid form followed by pressing of the paste through a sieve to form granules which then require drying and classification. However, this method can have disadvantages, such as contamination of the product by material abraded from the mixer or sieve, difficulty of repetitive control over product parameters which can affect subsequent operations, e.g. granule size, tap density etc., incomplete or non-homogeneous mixing of ceramic and binder, and excess plant holdup in a production process. Furthermore, the granules after production require to be dried to remove the liquid employed in the granulation.

It is therefore an object of the present invention to provide an alternative method of granulation in which the said disadvantages are at least partly overcome.

According to the invention, a method of granulating a ceramic nuclear fuel comprises mixing the ceramic nuclear fuel in powder form with a solution of a binder in an excess of non-aqueous solvent of at most low hydrogen content so as to form a slurry, and spray-drying the slurry to produce dry granules of the ceramic nuclear fuel having binder intimately incorporated therein.

The non-aqueous solvent may advantageously be one of the class: chlorinated hydrocarbons, for example trichloroethylene.

A suitable binder for use with $UO_2$ or mixed $UO_2$-$PuO_2$ powder is that known as "Cranko" (poly-butylmethacrylate in dibutyl phthalate) and a suitable solvent for this binder is trichloroethylene.

An example of the application of the said method to the granulation of $UO_2$ powder will now be described with reference to the accompanying drawing, the sole figure of which is a diagrammatic illustration of apparatus suitable for carrying out the said method.

Ball-milled or micronised $UO_2$ powder is fed to a hopper 1 which communicates by gravity feed via a valve 2 with a mixing vessel 3 provided with a power-driven agitator 4. Another mixing vessel 5 and having a power-driven agitator 6 is fed from a binder storage vessel 7 via a valve 8 and a solvent storage tank 9 via a valve 10, the binder vessel 7 being kept stocked by a pump 11 and the solvent tank by a pump 12. Binder consisting of Cranko (poly-butylmethacrylate in dibutyl phthalate and trichloroethylene) and trichloroethylene solvent are fed from vessel 7 and tank 9 respectively to the vessel 5 and are there mixed by the agitator 6 to produce a liquid containing trichlorethylene in excess of the amount required as binder solvent. A suitable amount of this liquid is then gravity-fed to the vessel 3, which communicates with the vessel 5 via a valve 13, and is there mixed by the use of agitator 4 with a suitable quantity of $UO_2$ powder from hopper 1. The vessel 3 also contains a submerged pump 14 which is employed to pump the slurry resulting from the mixing of $UO_2$ powder and binder liquid containing excess trichloroethylene to a stock tank 15 which is provided with a stirrer 16 to keep the $UO_2$ powder from settling. A submerged pump 17 serves for continuously transferring slurry from the stock tank 15 to a head tank 18 from whence the slurry flows by gravity via a valve 19 to the slurry inlet of a spray dryer 20.

The spray dryer 20 illustrated in the drawing is of the rotating disc type and has a power-rotated disc 21 on to which the slurry is fed in suitably sized drops. The spray dryer has a hot air inlet which allows air which has been filtered by a filter 22 and heated by a steam jacket heater 23, with or without an electrically heated booster 24, to be drawn into the spray dryer by an exhaust blower 25 which is connected to an outlet 26 at the bottom of the spray dryer 20 via a cyclone 27, bag filter 28 and absolute filter 29, these components ensuring that all solid matter is removed from the gas phase, consisting of air and vapourised solvent, the gas phase being disposed of to a conventional extract system or to a solvent recovery plant. Powder collecting vessels 30, 31 and 32 are provided at the spray dryer outlet 26, the cyclone 27 and the bag filter 28 respectively, and operate through rotary valves 33, 34 and 35 respectively. Vessel change-over valves 36, 37 and 38 respectively are also provided. Experience has shown that product removal from the air stream is possible with the cyclone omitted; this alternative is shown in the drawing by the dotted line 39 joining the spray drier outlet 26 directly to the bag filter 28.

Instead of the rotating-disc type of spray dryer which is illustrated, that type of spray dryer which employs a nozzle atomiser for the slurry feed (either spraying upwards or downwards), may alternatively be employed, the plant components being otherwise as illustrated in the drawing except for the necessary equipment (known) for feeding slurry to the nozzle.

A useful optional addition to either type of spray drier is an air rake which serves to assist the removal of product which has adhered to the wall of the spray drier vessel (such adhered product largely falls from the wall on drying out). The air rake comprises a perforated tube 40 bent to follow the base and wall of the spray dried, as illustrated in the drawing in dotted line, the tube 40 being angularly movable in a manner such that its path follows the wall of the spray drier, and the perforations of the tube 40 being arranged so as to direct a downward flow of air, which may be heated and which is supplied to the lower end of the tube 40, over the spray drier wall. The air from the tube 40 joins the outgoing air and product.

By way of example, typical quantities and operating conditions in prototype equipment may be as follows: for a 50 kgrm. batch of $UO_2$ powder, 3.7 kgrm. of binder (consisting of 1.32 kgrm. poly-butylmethacrylate and 0.18 kgrm. dibutyl phthalate in 2.25 kgrm. trichloroethylene) is fed from the vessel 7 to the mixing vessel 5, and 46 kgrms. (32 litres) trichloroethylene is fed from the tank 9 to the vessel 5, the two liquids being there mixed by the agitator 6. 50 kgrm. UO$_2$ powder from hopper 1 is fed to mixing vessel 3 and the mixed liquids from vessel 5 added, the agitator 4 serving to produce a slurry therefrom, which is transferred to the stock tank 15 and kept agitated by the stirrer 16, ready for transfer to the head tank 18 as required.

The prototype spray drying equipment has an 8 ft. diameter x 12 ft. height body, and in operation is initially brought up to operating temperature by drawing air at about 250° C. (using for heating the air the steam jacket 23 with or without the booster 24 as required) through the spray dryer 20, the cyclone 27 (if provided), the bag filter 28 and the absolute filter 29, by means of exhaust blower 25. The UO$_2$/binder/trichloroethylene slurry is then fed at approximately 50 kgrms. UO$_2$ per hour from the head tank 18 to the disc 21 (or nozzle atomiser if the said alternative form of spray-dryer is employed). About 80% of the dried granules so resulting are collected in the collecting vessel 30 at the spray dryer outlet, about 15% in the vessel 31 at the cyclone, and the remaining 5% in the vessel 32 at the bag filter. Typical runs with the cyclone 27 omitted and with somewhat larger granule sizes averaged 90% collection in the vessel 30 and 10% in the vessel 32. Any remaining UO$_2$ as fine dust is retained in the absolute filter 29. The trichloroethylene is completely vapourised by the hot air, and the binder is incorporated homogeneously in the granules.

The employment of a non-aqueous solvent with at most low hydrogen content, such as trichloroethylene, in an excess of the amount required to dissolve the binder is advantageous in two main respects. For nuclear fuel use, the UO$_2$ powder is required to be enriched in U$_{235}$ (to 5% for example) and criticality can be a problem where the concentration of material in amounts suitable for a full scale production process is concerned. If water were used for slurrying the UO$_2$, permissible concentrations would be small, which would severely restrict plant size and lead to an uneconomic process. However, because trichloroethylene is a much less effective neutron moderator than water because of its lower hydrogen content, the restriction on plant size is considerably eased. The similarly advantageous use of non-aqueous solvents with zero hydrogen content, such as carbon tetrachloride, is also envisaged. In fact, members of the class of chlorinated hydrocarbons are particularly suitable as non-aqueous solvent for the purposes of the invention.

Another important advantage lies in the fact that the kind of non-aqueous solvents envisaged generally have lower latent heat of evaporation and boiling point than those of water, which enables larger granules of spray-dried UO$_2$ to be produced in a given size of spray-dryer, compared with the granule size of water-slurried UO$_2$. In the specific case of trichloroethylene as non-aqueous solvent, its latent heat of evaporation is 57.3 15° C. cals./gram compared with 530.55 15° C. cals./gram for water, and its boiling point is 87.2° C. compared with 100° C. for water. For example, UO$_2$ granules of up to 250 microns can be produced using trichloroethylene as the slurrying medium. Generaly speaking, it has been found that larger UO$_2$ granules (compared with those produced by the rotating disc type of spray drier shown in the drawings) can be produced by employing the type of spray drier which has a nozzle atomiser producing an upward spray which contacts hot air from an inlet at the top of the spray drier and drawn downwardly by the extract system which is in communication with the bottom outlet of the spray drier.

Further advantages lie in the fact that it has been found that spray-drying produces granules of remarkably constant size, which makes a further granule classification step unnecessary, and in the fact that the spray-drying eliminates the further step of drying which was required in routes involving other methods of granulation in which liquids were involved. Thus spray-drying eliminates two production operations, which is economically attractive. It has also been found that fuel bodies formed by compacting (in automatic presses) the spray-dried UO$_2$ and then sintering are of better quality than those produced from material which has been produced by other routes, e.g. the sieve granulation route. The fuel bodies from spray-dried UO$_2$ are found to be more reproducible in dimensions after sintering and have a better surface finish, both of which may make a subsequent grinding-to-size operation unnecessary.

I claim:

1. In a process for the production of fuel bodies for nuclear reactors, the method of making granules of a ceramic nuclear fuel consisting of at least one of the group uranium dioxide and uranium dioxide/plutonium dioxide, said method comprising the steps of slurrying the ceramic nuclear fuel in powder form in a solution of an organic binder for uranium dioxide or uranium dioxide/plutonium dioxide in an excess of an organic chlorinated hydrocarbon solvent for said binder, and spray-drying the slurry to produce dry granules of the ceramic nuclear fuel having said binder intimately incorporated therein.

2. A process according to claim 1 wherein the ceramic nuclear fuel in powder form comprises uranium dioxide, the organic binder is polybutylmethacrylate in dibutylphthalate, and the solvent for the binder is trichloroethylene.

3. A process according to claim 1 wherein the ceramic nuclear fuel comprises uranium dioxide/plutonium dioxide made by mixing plutonium dioxide powder with uranium dioxide powder.

4. In a process for the production of fuel bodies for nuclear reactors, the method of granulating a ceramic nuclear fuel consisting of at least one of the group uranium dioxide and uranium dioxide/plutonium dioxide, said method comprising the steps of slurrying the ceramic nuclear fuel in powder form in a solution of an organic binder for uranium dioxide or uranium dioxide/plutonium dioxide in an excess of an organic solvent for said binder, said organic solvent being a chlorinated hydrocarbon of at most low hydrogen content, and spray-drying the slurry to produce dry granules of the ceramic nuclear fuel having binder intimately incorporated therein.

5. A process as set forth in claim 4 wherein said chlorinated hydrocarbon solvent has less hydrogen atoms than chlorine atoms per molecule of solvent.

6. A method for producing ceramic nuclear fuel granules having an organic binder incorporated therein comprising the steps of forming a slurry of powdered ceramic nuclear fuel comprising at least one member of the class consisting of uranium dioxide and uranium dioxide/plutonium dioxide with an organic binder for said ceramic fuel in an excess of an organic halogenated hydrocarbon solvent having less hydrogen atoms than halogen atoms per molecule of solvent, and spray-drying the slurry in a stream of hot gases to remove the hydrocarbon solvent from the slurry to produce dry granules of the ceramic nuclear fuel having said organic binder intimately incorporated therein.

References Cited by the Examiner

UNITED STATES PATENTS

| | | | |
|---|---|---|---|
| 3,082,163 | 3/1963 | Ogard et al. | 252—301.1 |
| 3,114,689 | 12/1963 | Cope | 252—301.1 |
| 3,137,742 | 6/1964 | Sowden | 252—301.1 |
| 3,194,852 | 7/1965 | Lloyd et al. | 264—.5 |
| 3,231,638 | 1/1966 | Garrett et al. | 264—.5 |

CARL D. QUARFORTH, *Primary Examiner.*

BENJAMIN R. PADGETT, *Examiner.*

S. J. LECHERT, JR., *Assistant Examiner.*